US011972658B2

(12) United States Patent
Wyllie et al.

(10) Patent No.: US 11,972,658 B2
(45) **Date of Patent: *Apr. 30, 2024**

(54) ELECTRONIC GAMING SYSTEM AND METHOD FOR MANAGING A WAGERING GAME BASED UPON PROXIMITY OF A MOBILE DEVICE TO AN ELECTRONIC GAMING MACHINE

(71) Applicant: Aristocrat Technologies Australia Pty Limited, Macquarie Park (AU)

(72) Inventors: Andrew Wyllie, North Ryde (AU); Alan Wong, West Pennant Hills (AU)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 155 days.

This patent is subject to a terminal disclaimer.

(21) Appl. No.: 17/543,345

(22) Filed: Dec. 6, 2021

(65) Prior Publication Data

US 2022/0092924 A1 Mar. 24, 2022

Related U.S. Application Data

(63) Continuation of application No. 16/774,088, filed on Jan. 28, 2020, now Pat. No. 11,210,893.

(30) Foreign Application Priority Data

Jan. 31, 2019 (AU) ................................ 2019900280
Dec. 11, 2019 (AU) ................................ 2019280011

(51) Int. Cl.
*G07F 17/32* (2006.01)

(52) U.S. Cl.
CPC ...... *G07F 17/3223* (2013.01); *G07F 17/3225* (2013.01); *G07F 17/3244* (2013.01)

(58) Field of Classification Search
CPC ............ G07F 17/3223; G07F 17/3225; G07F 17/3244
See application file for complete search history.

(56) References Cited

U.S. PATENT DOCUMENTS 8,216,072 B2 7/2012 Curtis
8,622,836 B2 1/2014 Nelson
(Continued)

OTHER PUBLICATIONS

Office Action (Notice of Allowance and Fees Due (PTOL-85)) dated Mar. 14, 2022 for U.S. Appl. No. 16/948,608 (pp. 1-12).
(Continued)

*Primary Examiner* — Werner G Garner
(74) *Attorney, Agent, or Firm* — Armstrong Teasdale LLP

(57) ABSTRACT

An electronic gaming system is configured to provide a wagering session on an electronic gaming machine based upon one or more communications received from a mobile device of a player, where the communications indicate a signal strength of a wireless beacon relative to the mobile device. For example, the mobile device may provide a first communication indicating that the mobile device is within a first distance of the electronic gaming machine. In response, the wagering session may be provided or initiated. Likewise, during gameplay, the mobile device may provide a second communication indicating that the mobile device has moved to within a second distance of the electronic gaming machine. In response, the wagering session may be continued or terminated, depending upon, for example, a comparison of the second distance to a threshold second distance.

20 Claims, 6 Drawing Sheets

(56) References Cited

U.S. PATENT DOCUMENTS

| | | | |
|---|---|---|---|
| 9,306,952 | B2 | 4/2016 | Burman |
| 9,472,049 | B2 | 10/2016 | Allen |
| 9,666,021 | B2 | 5/2017 | Nguyen |
| 9,754,443 | B2 | 9/2017 | Hedrick |
| 9,805,547 | B2 | 10/2017 | Price |
| 10,121,312 | B2 | 11/2018 | Allen |
| 10,391,392 | B2 | 8/2019 | Nelson |
| 2003/0013532 | A1 | 1/2003 | Rowe |
| 2003/0022719 | A1 | 1/2003 | Donald |
| 2006/0211493 | A1 | 9/2006 | Walker |
| 2010/0106611 | A1 | 4/2010 | Paulsen |
| 2014/0200065 | A1 | 7/2014 | Anderson |
| 2015/0235521 | A1 | 8/2015 | Lutnick |
| 2016/0093166 | A1 | 3/2016 | Panambur |
| 2019/0043306 | A1 | 2/2019 | Higgins |

OTHER PUBLICATIONS

Office Action (Non-Final Rejection) dated Aug. 12, 2022 for U.S. Appl. No. 17/371,569 (pp. 1-5).

Office Action (Non-Final Rejection) dated Sep. 26, 2022 for U.S. Appl. No. 17/491,020 (pp. 1-6).

Office Action (Notice of Allowance and Fees Due (PTOL-85)) dated Nov. 4, 2022 for U.S. Appl. No. 17/491,020 (pp. 1-8).

Office Action (Notice of Allowance and Fees Due (PTOL-85)) dated Nov. 14, 2022 for U.S. Appl. No. 17/371,569 (pp. 1-8).

Office Action (Non-Final Rejection) dated Jul. 19, 2021 for U.S. Appl. No. 16/774,088 (pp. 1-17).

Office Action dated Mar. 16, 2021 for U.S. Appl. No. 16/787,917 (pp. 1-12).

Notice of Allowance dated Jun. 16, 2021 for U.S. Appl. No. 16/787,917 (pp. 1-8).

Office Action (Notice of Allowance and Fees Due (PTOL-85) dated Sep. 1, 2021 for U.S. Appl. No. 16/774,088 (pp. 1-9).

Office Action (Non-Final Rejection) dated Sep. 23, 2021 for U.S. Appl. No. 16/948,608 (pp. 1-13).

Office Action (Notice of Allowance and Fees Due (PTOL-85)) dated Nov. 9, 2021 for U.S. Appl. No. 16/774,088 (pp. 1-8).

Office Action (Non-Final Rejection) dated Dec. 15, 2022 for U.S. Appl. No. 17/811,827 (pp. 1-10).

Office Action (Notice of Allowance and Fees Due (PTOL-85)) dated Mar. 6, 2023 for U.S. Appl. No. 17/811,827 (pp. 1-11).

Office Action (Non-Final Rejection) dated Aug. 21, 2023 for U.S. Appl. No. 18/160,854 (pp. 1-6).

Office Action (Non-Final Rejection) dated Sep. 7, 2023 for U.S. Appl. No. 18/160,842 (pp. 1-6).

Australian Examination Report No. 2 issued in App. No. AU2019232826, dated Oct. 2, 2023, 4 pages.

Office Action (Notice of Allowance and Fees Due (PTOL-85)) dated Dec. 4, 2023 for U.S. Appl. No. 18/160,842 (pp. 1-7).

Office Action (Notice of Allowance and Fees Due (PTOL-85)) dated Dec. 1, 2023 for U.S. Appl. No. 18/160,854 (pp. 1-7).

ELECTRONIC GAMING SYSTEM AND METHOD FOR MANAGING A WAGERING GAME BASED UPON PROXIMITY OF A MOBILE DEVICE TO AN ELECTRONIC GAMING MACHINE

CROSS REFERENCE TO RELATED APPLICATIONS

This application is a continuation of and claims priority to U.S. patent application Ser. No. 16/774,088, filed Jan. 28, 2020, which claims priority to Australian Patent Application Serial No. 2019280011, filed Dec. 11, 2019, which claims priority to Australian Provisional Patent Application Serial No. 2019900280, filed Jan. 31, 2019, all of which are incorporated by reference herein in their entireties.

FIELD

The present application relates to a gaming system with proximity based funds transfer.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In many games, a player may qualify for secondary games or bonus rounds by attaining a certain winning combination or triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player (RTP=return to player) over the course of many plays or instances of the game. The RTP and randomness of the RNG are critical to ensuring the fairness of the games and are therefore highly regulated. Upon initiation of play, the RNG randomly determines a game outcome and symbols are then selected which correspond to that outcome. Notably, some games may include an element of skill on the part of the player and are therefore not entirely random.

In larger venues, systems are provided that enable additional functionality to be provided alongside gaming machines. For example, player tracking systems enable a venue to track a player's play and provide additional rewards to players based on factors such as the amount the player wagers or how frequently they wager.

Player tracking systems enable a user to establish an account and transfer credits to the gaming machine and back to the player account. In some implementations a player marketing module is provided at the gaming machine, and after a player enters a player tracking card, the player marketing module communicates with the player tracking module, which communicates with the player tracking system to cause a download of the balance of the player the account to the player marketing module. The player marketing module then adds the downloaded account balance to the credit meter of the gaming machine. When the player removes the player tracking card at the end of a gaming session, the player marketing module removes the credits from the gaming machine and sends them to the player tracking system for storage as a currency value in the player account.

BRIEF DESCRIPTION

In embodiments of the disclosure, a user's mobile terminal monitors a signal transmitted at a gaming device (e.g. from a Bluetooth beacon) in order to check that the user is still at the gaming device. If the mobile terminal determines that it is more than an acceptable distance from the gaming device based on the signal (e.g. because the signal strength drops below a floor), the mobile terminal takes action to end a gaming session and/or initiate a transfer of funds from the gaming device to user's account. For example, the mobile terminal sends a message to an account server which communicates with the gaming device or an associated player marketing module in order to remove any credits from the meters of gaming device.

An embodiment provides a funds transfer method for a gaming system, the method includes determining that a mobile terminal associated with a user satisfies a first proximity criterion in respect of a gaming device based upon at least a first signal transmission associated with the gaming device in order to initiate a game session, and monitoring the mobile terminal satisfying a second proximity criterion with respect to the gaming device during the game session based upon at least a second signal transmission associated with the gaming device which is subsequent to the at least a first signal transmission. The first proximity criterion is for monitoring a closer proximity than the second proximity criterion. Upon the mobile terminal ceasing to satisfy the second proximity criterion, the method includes automatically initiating a funds transfer of an entire credit balance of the credit meter from the gaming device to a gaming wallet of the user stored on an account server.

Another embodiment provides a game session control method for a gaming system. The method includes initiating a game session associated with a mobile terminal at a gaming device, and monitoring the mobile terminal satisfying an ongoing proximity criterion with respect to the gaming device based a signal transmission associated with the gaming device which is subsequent to the at least a first signal transmission. The ongoing proximity criterion is indicative that the user of the mobile terminal is located at the gaming device when using the mobile terminal to carry out a mobile terminal action. Upon the mobile terminal ceasing to satisfy the ongoing proximity criterion, the method includes automatically ending the game session.

Another embodiment provides a mobile terminal, the mobile terminal is configured to determine that the mobile terminal satisfies a first proximity criterion in respect of a gaming device based on at least a first signal transmission associated with the gaming device, monitor a second proximity criterion with respect to the gaming device based on at least a second signal transmission associated with the gaming device which is subsequent to the at least a first signal transmission. The first proximity criterion is for monitoring a closer proximity than the second proximity criterion, and upon the ceasing to satisfy the second proximity criterion, automatically initiate a funds transfer of an entire credit balance of the credit meter from the gaming device to a gaming wallet of a user account associated with the mobile terminal. The user account stored on an account server.

Another embodiment provides a gaming system, the gaming system including an account server storing a gaming wallet of a user, and at least one transmitter associated with a gaming device. The at least one transmitter transmits at least a first signal associated with the gaming device to enable a mobile terminal associated with a user to determine that the mobile terminal satisfies a first proximity criterion in respect of the gaming device based upon the at least a first signal, and at least a second signal transmission associated with the gaming device which is subsequent to the at least a first signal transmission to enable the mobile terminal to monitor whether the mobile terminal satisfies a second proximity criterion with respect to the gaming device, wherein the first proximity criterion is for monitoring a closer proximity than the second proximity criterion. The gaming system is further configured to, responsive to receiving a communication from the mobile terminal indicative of the mobile terminal ceasing to satisfy the second proximity criterion, automatically transfer an entire credit balance of the credit meter from the gaming device to the gaming wallet of the user.

Another embodiment provides a gaming system, the gaming system including at least one transmitter associated with a gaming device. The gaming system is configured to initiate a game session associated with a mobile terminal. The at least one transmitter is configured to transmit a signal associated with a gaming device, and to enable the mobile terminal to monitor whether the mobile terminal satisfies an ongoing proximity criterion with respect to the gaming device, wherein the ongoing proximity criterion is indicative that the user of the mobile terminal is located at the gaming device when using the mobile terminal to carry out a mobile terminal action. The gaming system is configured to end the game session upon receiving a signal from the mobile terminal indicative of the mobile terminal ceasing to satisfy the ongoing proximity criterion.

BRIEF DESCRIPTION OF THE DISCLOSURE

DETAILED DESCRIPTION

Figure 1:
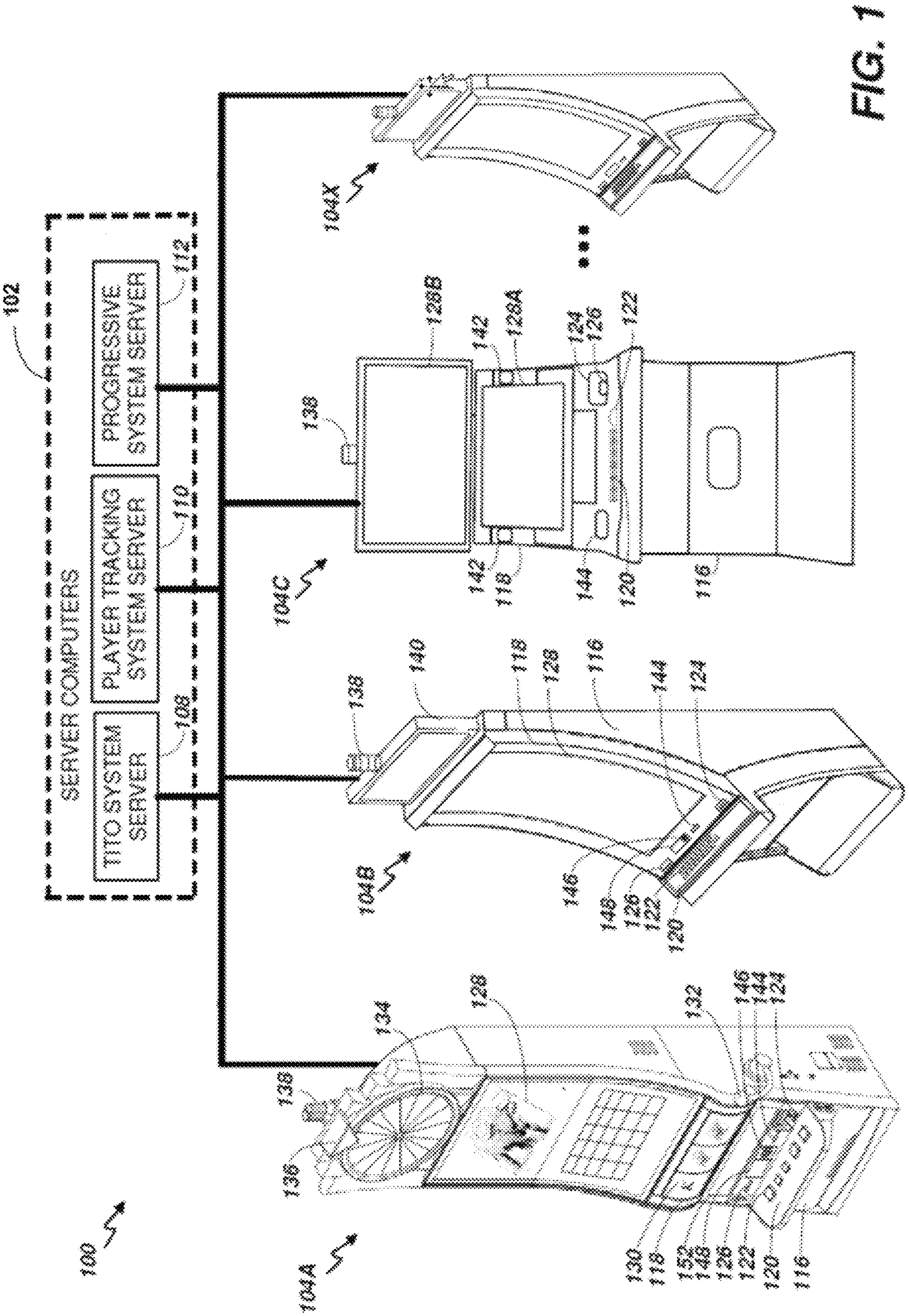
FIG. 1 is an exemplary diagram showing several EGMs networked with various gaming related servers.

FIG. 1 illustrates several different models of EGMs 104 which may be networked to various gaming related servers of a casino management system 102 to form a gaming system 100. Gaming devices 104A-104X can be slot machines, video poker machines, bingo machines, etc.

Communication between the gaming devices 104A-104X and the server computers 102 using one or more networking protocols, for example via an Ethernet or using a multi-drop floor protocol.

The casino management system 102 may include, a ticket-in-ticket-out (TITO) system server 108, a player tracking system server 110, and/or a progressive system server 112.

Gaming device 104A is often of a cabinet construction which may be aligned in rows or banks of similar devices for placement and operation on a casino floor. The gaming device 104A often includes a main door 116 which provides access to the interior of the cabinet. Gaming device 104A typically includes a button area or button deck 120 accessible by a player that is configured with input switches or buttons 122, an access channel for a bill validator 124, and/or an access channel for a ticket printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to determine an outcome to the game. In embodiments where the reels are mechanical, mechanisms can be employed to implement greater functionality. For example, the boundaries of the gaming display area boundaries of the gaming display area 118 may be defined by one or more mechanical shutters controllable by a processor. The mechanical shutters may be controlled to open and close, to correspondingly reveal and conceal more or fewer symbol positions from the mechanical reels 130. For example, a top boundary of the gaming display area 118 may be raised by moving a corresponding mechanical shutter upwards to reveal an additional row of symbol positions on stopped mechanical reels. Further, a transparent or translucent display panel may be overlaid on the gaming display area 118 and controlled to override or supplement what is displayed on one or more of the mechanical reel(s).

In many configurations, the gaming machine 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor.

In some embodiments, the bill validator 124 may also function as a "ticket-in" reader that allows the player to use a casino issued credit ticket to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are used to generate and track unique bar-codes or other indicators printed on tickets to allow players to avoid the use of bills and coins by loading credits using a ticket reader and cashing out credits using a ticket-out printer 126 on the gaming device 104A. In some embodiments a ticket reader can be used which is only capable of reading tickets. In some embodiments, a different form of token can be used to store a cash value, such as a magnetic stripe card.

In some embodiments, a player tracking card reader 144, a transceiver for wireless communication with a player's smartphone, a keypad 146, and/or an illuminated display 148 for reading, receiving, entering, and/or displaying player tracking information is provided in EGM 104A. In such embodiments, a game controller within the gaming device 104A can communicate with the player tracking system server 110 to send and receive player tracking information.

In an embodiment, corresponding functionality can be provided by a player marketing module 105 which also includes a transceiver for wireless communication with a player's smartphone, a keypad and/or an illuminated display 148 for reading, receiving, entering, and/or displaying player tracking information. The player marketing module communicates with both the player tracking system and the game controller within the related gaming devices. An advantage of a separate player marketing module 105 is that a venue that uses gaming machines from a number of manufacturers and/or older gaming machines can provide common player tracking interface across a fleet of gaming machines. In some examples, the player marketing module may be configured to place communications onto a bus of the EGM and/or intercept communications placed on the bus by the game controller.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Figure 2:
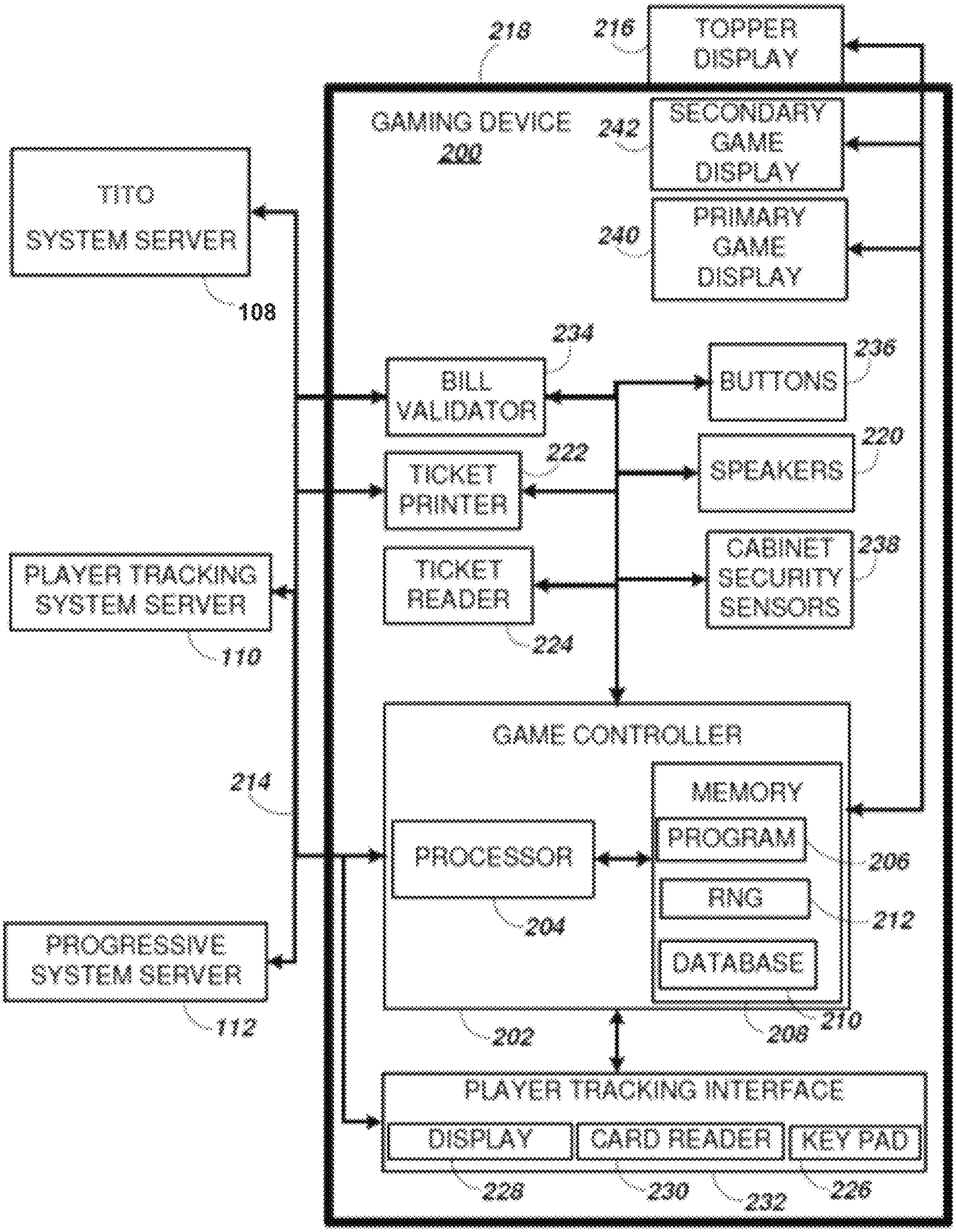
FIG. 2 is a block diagram showing various functional elements of an exemplary EGM.

Many or all the above described components can be controlled by circuitry (e.g., a gaming controller) housed inside the main cabinet 116 of the gaming device 104A, the details of which are shown in FIG. 2.

Note that not all gaming devices suitable for implementing embodiments of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or table tops and have displays that face upwards.

An alternative example gaming device 104B illustrated in FIG. 1 is the Arc™ model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main door 118 which opens to provide access to the interior of the gaming device 104B. The main or service door 118 is typically used by service personnel to refill the ticket-out printer 126 and collect bills and tickets inserted into the bill validator 124. The door 118 may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2 is a block diagram depicting exemplary internal electronic components of a gaming device 200 connected to various external systems. All or parts of the example gaming device 200 shown could be used to implement any one of the example gaming devices 104A-X depicted in FIG. 1. The games available for play on the gaming device 200 are controlled by a game controller 202 that includes one or more processors 204 and a game that may be stored as game software or a program 206 in a memory 208 coupled to the processor 204. The memory 208 may include one or more mass storage devices or media that are housed within gaming device 200. Within the mass storage devices and/or memory 208, one or more databases 210 may be provided for use by the program 206. A random number generator (RNG) 212 that can be implemented in hardware and/or software is typically used to generate random numbers that are used in the operation of game play to ensure that game play outcomes are random and meet regulations for a game of chance. In some embodiments, the random number generator 212 is a pseudo-random number generator.

Alternatively, a game instance (i.e. a play or round of the game) may be generated on a remote gaming device such as a central determination gaming system server. The game instance is communicated to gaming device 200 via the network 214 and then displayed on gaming device 200. Gaming device 200 may execute game software, such as but not limited to video streaming software that allows the game to be displayed on gaming device 200. When a game is stored on gaming device 200, it may be loaded from a memory 208 (e.g., from a read only memory (ROM)) or from the central determination gaming system server 106 to memory 208. The memory 208 may include RAM, ROM or another form of storage media that stores instructions for execution by the processor 204.

The gaming device 200 may include a topper display 216 or another form of a top box (e.g., a topper wheel, a topper screen, etc.) which sits above main cabinet 218. The gaming cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. The player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. Again, as described above, the player tracking interface could be replaced by a standalone player marketing module. Ticket printer 222 may be used to print tickets for a TITO system server 108. The gaming device 200 may further include a bill validator 234, buttons 236 for player input, cabinet security sensors 238 to detect unauthorized opening of the cabinet 218, a primary game display 240, and a secondary game display 242, each coupled to and operable under the control of game controller 202.

Gaming device 200 may be connected over network 214 to player tracking system server 110. Player tracking system server 110 may be, for example, an System 7000® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play.

Gaming devices, such as gaming devices 104A-104X, 200, are highly regulated to ensure fairness and, in many cases, gaming devices 104A-104X, 200 are operable to award monetary awards (e.g., typically dispensed in the form of a redeemable voucher). Therefore, to satisfy security and regulatory requirements in a gaming environment, hardware and software architectures are implemented in gaming devices 104A-104X, 200 that differ significantly from those of general-purpose computers. Adapting general purpose computers to function as gaming devices 200 is not simple or straightforward because of: 1) the regulatory requirements for gaming devices 200, 2) the harsh environment in which gaming devices 200 operate, 3) security requirements, 4) fault tolerance requirements, and 5) the requirement for additional special purpose componentry enabling functionality of an EGM. These differences require substantial engineering effort with respect to game design implementation, hardware components and software.

When a player wishes to play the gaming device 200, he/she can insert cash or a ticket voucher through a coin acceptor (not shown) or bill validator 234 to establish a credit balance on the gamine machine. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views the game outcome on the game displays 240, 242. Other game and prize information may also be displayed. In an embodiment, inserting a loyalty card also enables the player to transfer funds from a central account stored within the player tracking system server 110 to an EGM 104. The gaming system 100 of the embodiments contains additional functionality described in further detail below that enables an alternative technique for transferring funds to an EGM without requiring a player to present a loyalty club card.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other input device which enables a player to input information into the gaming device 200. In some embodiments, a player's selection may apply across a plurality of game instances. For example, if the player is awarded additional game instances in the form of free games, the player's prior selection of the amount bet per line and the number of lines played may apply to the free games. The selections available to a player will vary depending on the embodiment. For example, in some embodiments a number of pay lines may be fixed. In other embodiments, the available selections may include different numbers of ways to win instead of different numbers of pay lines.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance. In some examples the player cashes out by pressing a cash out button to receive a ticket from the ticket printer 222). The ticket may be "cashed-in" for money or inserted into another machine to establish a credit balance for play. An additional technique for cashing out is described below.

Figure 3:
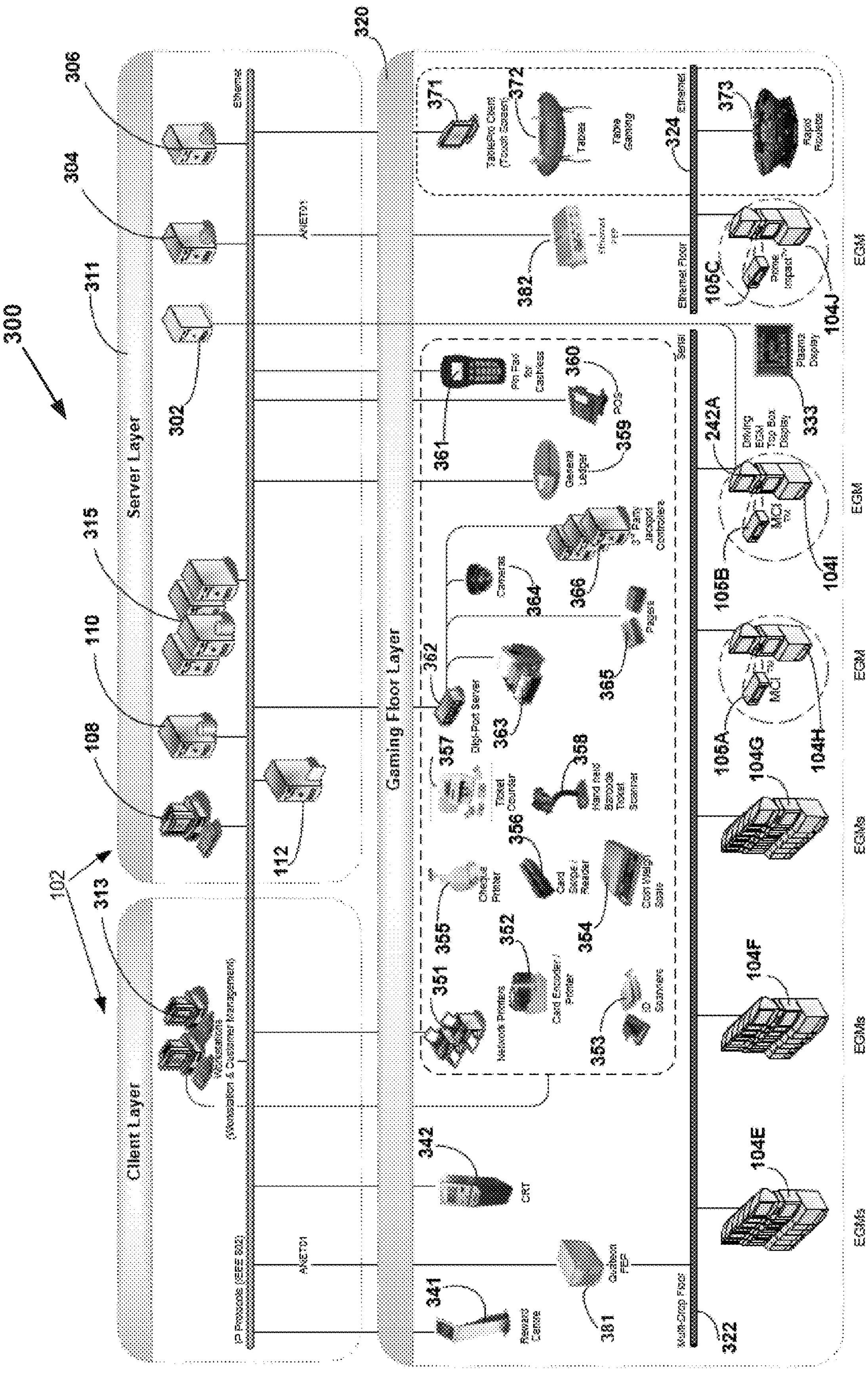
FIG. 3 is an exemplary diagram of a venue architecture.

FIG. 3 shows an example venue architecture 300. In FIG. 3 example functions provided by the server layer 311 of the casino management system 102 are shown as being provided by separate servers for illustrative purposes. In other embodiments, some functions may be provided by the same server (or the same group of servers where more than one server is needed to balance server load).

FIG. 3 illustrates that modern casino (or other venue) management systems need to be able to manage a wide-range of functionality. It will be appreciated that the functionality that is provided will, to some extent, depend on the complexity of the venue being managed. FIG. 3 includes only examples of the devices that may be interconnected within a venue.

The venue architecture has a client layer 310, a server layer 311 and a gaming floor layer 320. The client layer and the server layer are connected in a local area network via Ethernet. Venue architecture 300 also includes connections to external networks, e.g. the Internet (not shown).

Client layer 310 consist of a number of workstations 313 for accessing services provide by the server layer 311. Different levels of access are provided to different workstations. For example, some work stations may only allow access to the player tracking system to enable employees to enroll new loyalty members or edit member details.

In the example, the server layer 311 provides a ticket-in-ticket-out (TITO) system server 108, a player tracking system server 110, a progressive system server 112, a graphics server 302, a reports web server 304 and a table game server 306. Other servers 315 are provided to carry out network functionality such as backing up data, providing redundancy.

Gaming layer 320 provides two separate networks 322, 324 for connecting EGMS 104 to the server layer 311. In other embodiments, there may be a single network. A first network is a multi-drop floor protocol network 322 that enables connections via serial ports of the EGMs. As shown in FIG. 3 each EGM 104E-104I within the multi-drop floor protocol network is connected via a front end processor 381, 382 to the server layer. There may be a number of front end processors 381 connected to subsets of the EGMs 104.

As shown in FIG. 3, player marketing modules 105A, 105B may be provided at each EGM 104.

The second network is an ethernet based network 324. Other EGMs 104J, player marketing modules 105C, and automated table games such as an automated roulette table 373 are be connected via this network. Again, one or more front end processor 382 connect the EGMS to the server layer 311.

In some embodiments, network connections may be different for EGMs 104 and the player tracking modules 105 provided at the respective EGMs 105. For example, a given EGM 104 may be connected to the multi-drop floor 322 while the player tracking module is connected to the Ethernet 324.

Gaming floor layer 320 also includes a reward centre kiosk 341 and a Cash Redemption Terminal (CRT) 342. Table clients 372 for use at gaming tables are also in the floor layer. The table clients communicate with table game server 306.

A wide variety of other components are provided within the gaming floor layer 320 including network printers 351, card encoder/printers 352, ID scanners 353, cheque printers 355, card swipe/readers 356, coin weigh scales 354, general ledger software 359, point of sale terminals 360 and pin pad terminals 361.

Third party components can be connected by a Digi-Port server 362 such as a ticket in a barrel machine 363, security cameras 364, pagers 365, and third-party jackpot controllers 366.

A graphics server 302 drives one or more standalone displays 333 and/or may drive a top box display 242A of an EGM 104I.

In recent times, there has been a trend towards users of loyalty systems being able to present their loyalty cards using an electronic version of the loyalty card stored on their mobile terminal, for example, by scanning a virtual barcode at the time of making a transaction or by near field communication of the loyalty card data to a point of sale terminal. The inventors have realized that Integrating mobile terminal based loyalty cards provides additional challenges within a casino management system 102 because of factors such as a) strict regulatory requirements, b) users wanting to user their mobile terminal for other reasons; and c) player tracking systems 110 needing to monitor entire gaming sessions in order to be effective.

In this respect, in order to connect to player tracking systems 110, a user can insert their player tracking card at the beginning of a gaming session and this initiates a transfer of funds to the player marketing module 105 which then adds the funds to the credit meter of the associated gaming device 104. In some arrangements when a user removes their loyalty card, and the player has not already cashed out of the gaming device, the removal of the card initiates a cash out process where the player marketing module removes credit from the gaming machine 104 and transfers the credit balance to the player tracking system which stores the balance against the user account. One additional challenge for mobile terminal based loyalty cards when used when playing at a gaming device is the possible loss of communications between the mobile and system due to factors such as the player's actions (e.g., switching off the phone, terminating the mobile app), failure of the phone (e.g., out of power), and loss or interference with signals resulting in the mobile terminal not being able to notify the system of the player's departure from the gaming machine.

As a user may want to use their mobile terminal while playing a gaming device, for example, to take a phone call, send an email, take photos etc., the inventors have realized that it would be inconvenient to replicate existing loyalty card systems with a mobile terminal-based loyalty card. For example, requiring a user to leave their phone in close proximity to the gaming machine (for example, next to a near field communication protocol device) during a gaming session would prevent the user from using their mobile terminal in the normal fashion. Such an arrangement would be undesirable because of the risk of a user inadvertently interrupting a gaming session. Further, some users may not be comfortable to leave their phone on the gaming terminal which would result in less take up of the mobile terminal-based loyalty card.

Figure 4:
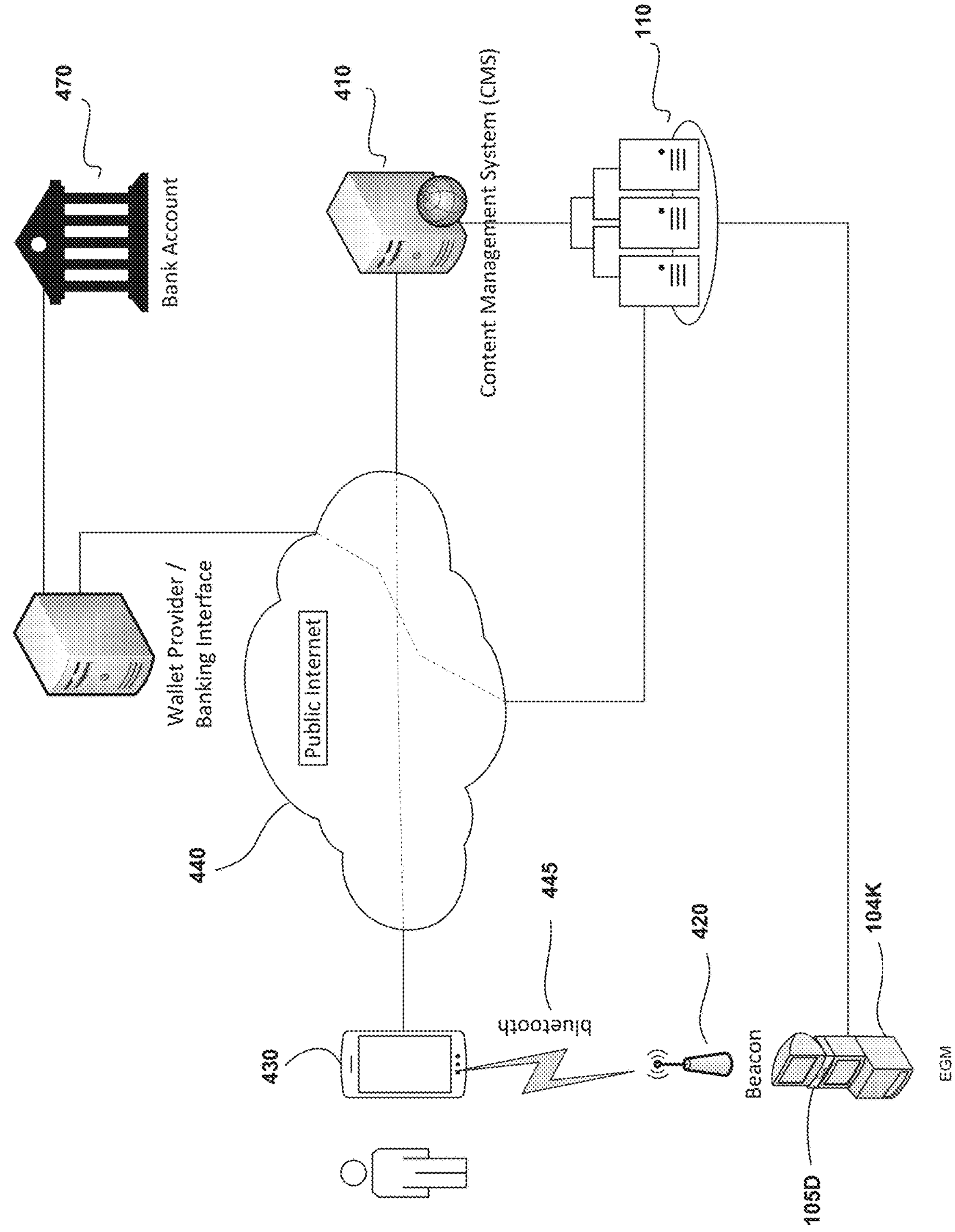
FIG. 4 is a block diagram of a funds transfer arrangement.

Referring to FIG. 4, there is shown a schematic diagram of an arrangement of an embodiment for enabling a funds transfer method (for example, as set out in FIG. 5) for a gaming system that enables use of a mobile terminal-based loyalty card without the deficiencies outlined above.

FIG. 4 illustrates a user mobile terminal 430 in the form of a Bluetooth enable smartphone. Other mobile terminals may be used, for example, tablets (such as an iPad) with cellular and Bluetooth communication capability or smart watches with cellular and Bluetooth communication capability. Further some venue configurations may permit the mobile terminal to communicate via a wi-fi network in which case cellular communication capability is unnecessary. In some configurations, communications may occur solely via a venue's wi-fi network to assist in identifying that a mobile terminal is in the venue.

In FIG. 4, a loyalty application has been downloaded to a mobile terminal. A user interacts with the loyalty application to complete registration details, for example to establish an account and register their membership of the player tracking system 110, for example, by entering an existing player tracking identifier, scanning a player loyalty card, or establishing a new account within the player tracking system.

In this embodiment, the loyalty application enables a user to connect over the internet 440 to a mobile wallet provider 460 in order to transfer funds from a user bank account 470 to the player tracking system 110 which adds the funds to a gaming wallet of the user account that the user can access at EGMs 104. in other embodiments, the user may initiate a funds transfer via a bank account interface. Further, while FIG. 4 shows integration with a player tracking system, other embodiments may employ a separate user account server to maintain the user account.

As shown in FIG. 4, the mobile terminal 430 connects to the player tracking system via a content management system 410 configured to control the information presented via the mobile application to the mobile terminal. This arrangement enables the same mobile application to be used across a number of different gaming venues with the presentation of content specific to the venue being controlled by the content management system 410.

As shown in FIG. 4, a Bluetooth beacon 420 is provided at each gaming device. Each Bluetooth beacon 420 has a unique identifier that it broadcasts 445 to nearby Bluetooth enabled devices. In an embodiment, the identifier of the Bluetooth beacon 420 is stored in the memory of the player tracking system in association with an identifier identifying the gaming machine with which the beacon is associated. Some beacons incorporate functionality that enables the unique identifier to be changed in which case the identifier is updated in the memory each time it is changed. While show as a separate component is FIG. 4 for illustrative purposes, beacon 420 is provided within player marketing module 105D in the embodiment and is under control of a processor of the player marketing module 105D. In other embodiments, the beacon could be incorporated within the EGM 104K.

Figure 5A:
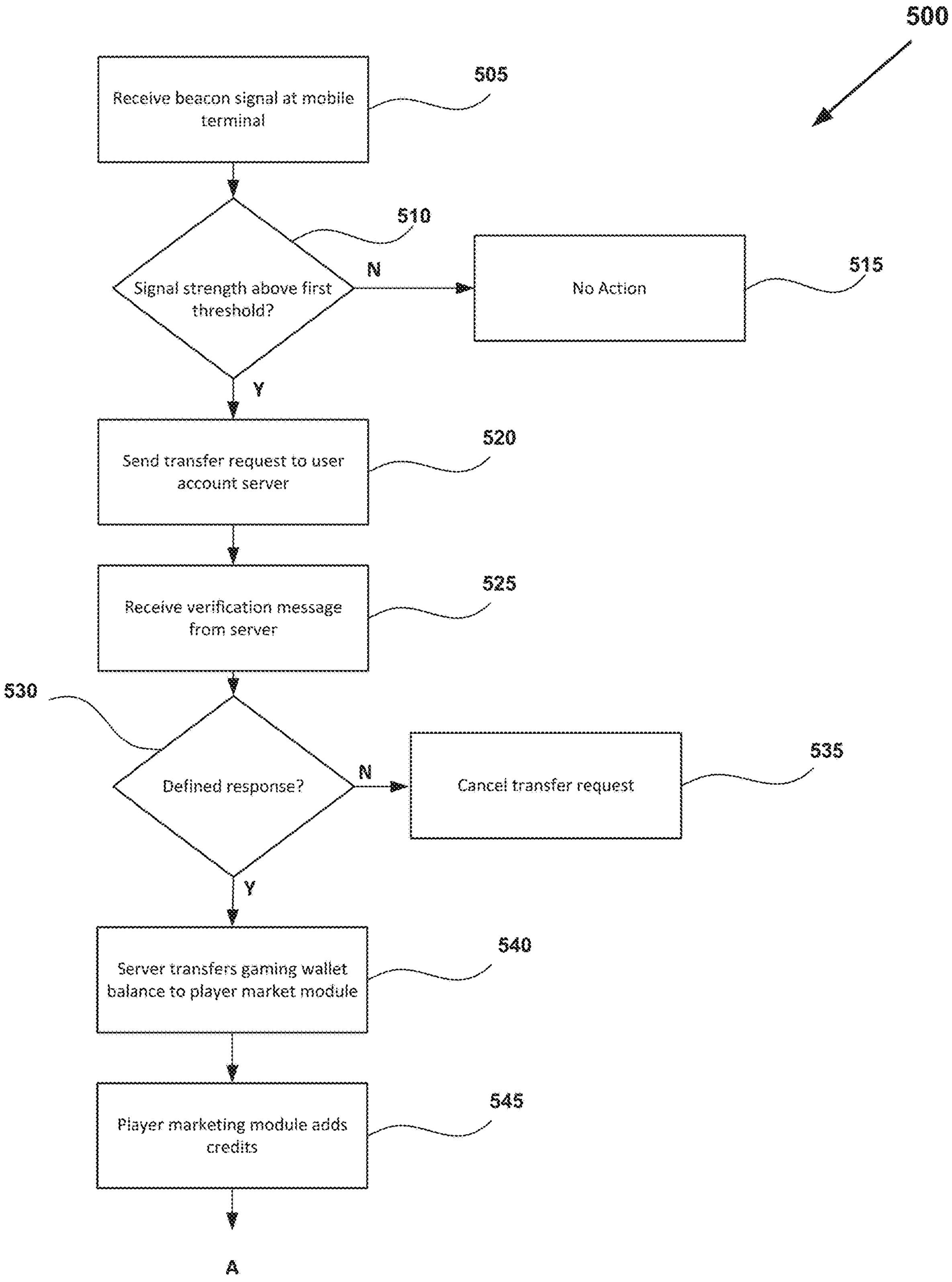
FIGS. 5A and 5B show a flow chart of a fund transfer method.
Figure 5B:
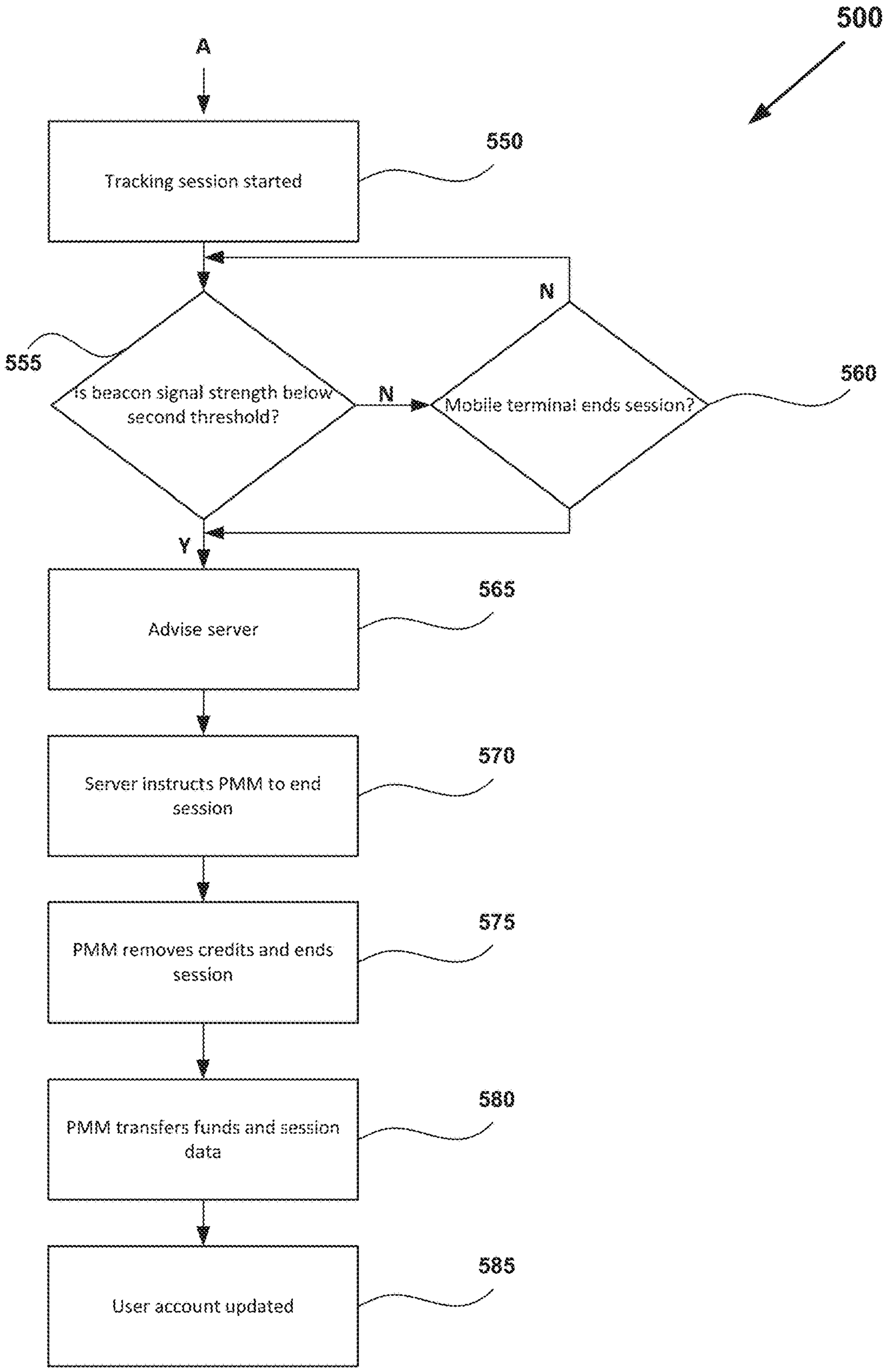

FIG. 5 shows a funds transfer method 500 of an embodiment. In the embodiment, the user opens the mobile application on their mobile terminal when approaching an EGM. At step 505, the mobile terminal 430 receives a Beacon signal. At step 510, the mobile terminal 430 measures the signal strength of the beacon and determines whether the signal strength is above a first threshold. In this example, the signal strength being above the first threshold is a first (or initial) proximity criterion for determining that the mobile terminal is within a close enough proximity of the EGM. In some embodiments, the mobile application includes a "connect" virtual button which the user needs to touch before the mobile terminal measures the signal strength so that the user can ensure that the mobile terminal is close to their desired EGM before the mobile application attempts to acquire the beacon signal. In an example, an additional proximity criterion is that the signal strength of the beacon is the strongest beacon signal that the mobile terminal has received in a defined time period, for example, the last 3 seconds. In one example, the first proximity criterion is set so that the mobile terminal has to be placed very close to the EGM, e.g. 10-20 CM in order for the first proximity criterion to be satisfied.

If the signal strength is not above the threshold, the mobile terminal either takes no action or outputs an error message at step 515.

At step 520 the mobile terminal 430 sends a funds transfer request to the user account server (in this example, a player tracking system server 110) over the public internet 440. The funds transfer request includes a beacon identifier extracted from the beacon signal. In another example, the mobile terminal 430 sends the funds transfer request over a local wi-fi network to the server 110.

In response to receiving the funds transfer request, the player tracking system server 110 extracts the beacon identifier and uses the beacon identifier to identify the EGM associated with the beacon. The server 110 uses the identity of the EGM to generate a verification message containing information identifying the EGM and sends it to the mobile terminal. In an example, the information is an image of the game available for play at the EGM. In other examples, the information is alternatively or additionally the name of the game or an identifier shown at the EGM, for example, displayed on the display of the player marketing module 105D.

At step 530, the mobile terminal waits for the user to enter a defined response to the verification message, e.g. to touch a button confirming that they have received a verification message for the correct machine. If a defined response is not received, at step 535 the transfer request is cancelled.

Assuming the user enters the defined response at step 530, at step 540, the server transfers a balance of a user account (referred to as a "gaming wallet") to the player marketing module 105D.

At step 545 the player marketing module 105D adds the equivalent value in credits to the credit meter of the EGM. In other examples, the user selects an amount to transfer as part of generating a transfer request. In other examples, the user may be able to pre-configure an amount to be transferred (e.g. a desired amount to spend).

The player marketing module 105D starts a tracked gaming session at step 550.

In an alternative embodiment, the verification is performed by the player marketing module 105D displaying a code, which can be randomly generated and sent to the server 110. In an example, this code (e.g. a barcode, QR code, or numeric code) is read by the Mobile App and or entered by the member into the App and sent to the server 110. When the transmitted code matches the player marketing module's 105D code, the member's physical presence at that EGM is confirmed.

At step 555, the mobile terminal 430 begins a process of monitoring the beacon signal strength associated with the EGM to determine whether a second, ongoing proximity criterion is met. In the embodiment, the second proximity criterion is a second threshold, lower than the first threshold. That is the second proximity criterion corresponds to the mobile terminal being further from the EGM 104K than to satisfy the first proximity criterion. In this way the user can use their phone in a normal fashion, for example, to take calls, send messages, or take photos. However, should the user walk away from the EGM 104K without ending a gaming session, the mobile terminal 430 will determine that the signal strength has fallen below the second threshold and take action to end the gaming session. Thus, if for example, the user takes a call and walks away from the EGM 104K the session can be ended automatically by the mobile terminal.

In another example, the user may simply forget to end the gaming session manually and walk away with their mobile terminal which can end the session automatically.

In an example, the second, ongoing proximity criterion is configured based on an estimate of a distance the user will be from the player marketing module 105D when using the mobile terminal 430 in a conventional manner. In some examples, a tolerance is built in to avoid accidental disconnection. In an example, the second threshold is configured so that the mobile terminal 430 ends the gaming session upon the mobile terminal 430 being more than 1 m from the EGM 105D. In other examples, the second threshold is configured so that the mobile terminal 430 ends the gaming session upon the mobile terminal 430 being more than 1.5 m, or more than 2 m, or more than 3 m or more than 5 m from the EGM 105D. In an example, the second proximity criterion is indicative that the user of the mobile terminal 430 is located at the gaming device when using the mobile terminal to carry out a mobile terminal action such as taking a call, sending a message, or taking a photo.

In another embodiment, the player marketing module 105D may increase the power of the beacon transmission after the gaming session is established. In this example, the second threshold could be the same or higher than the first threshold yet be indicative that the mobile terminal is further from the EGM.

In this respect, at step 565, the mobile terminal communicates to the server 110 that it has lost contact with the beacon and the server instructs the player marketing module 105D to end the gaming session at step 570.

At step 575, the player marketing module 105D ends the gaming session and removes credits from the EGM 104K. Removing the credits from the EGM prevents another person from playing at the EGM with the user's credit.

At step 580, the player marketing module 105D transfers the funds to the server 110 which adds the funds to the gaming wallet of the user. The player marketing module 105D also communicates data about the gaming session so that the server can update the player's loyalty membership records.

At step 580, the server 110 updates the gaming wallet and the user's loyalty membership records.

Referring again to step 555, while the mobile terminal determines that the second proximity criterion is met, the user may at any time end the gaming session manually at step 560, for example by selecting an "end session" button via the user interface of the mobile application running on mobile terminal 430.

In an example, when the mobile terminal 430 is more than a defined distance (e.g. 1 m) from the beacon, the mobile application will warn the user and instruct the user to either terminate the game session or move back to the EGM. If the mobile terminal remains outside the defined distance for a certain duration (configurable), the mobile application automatically instructs the server 110 to terminate the game session and move any money on the EGM 104 to the player's account.

In some examples, the mobile terminal 430 continuously polls the server 110 allowing both the mobile terminal 430 and the server to verify that communication is still active. Should the communication fail (as described above), the server 110 will automatically terminate the game session. In some examples, the mobile terminal may be configured to wait a defined period or conduct a defined number or reconnection attempts prior to determining that communication has failed.

In some embodiments, there may not be an initial funds transfer when the gaming session when a gaming session is initiated. In an example, steps 540 and 545 are replaced by a step of the server advising the player marketing module 105D to start a tracking session (which is implicit in the funds transfer of step 540) and a step of the user adding credit to the gaming machine using another credit mechanism at the EGM 104K such as a bill validator 234.

In another example, there may not be a funds transfer at the end of a gaming session ended in response to determining that the user mobile terminal 430 no longer satisfies a proximity condition, for example, all of the funds on the EGM may have been exhausted or the player marketing module 105D may just monitor the gaming session for player tracking purposes and the user may need to cash out via other means such as via a ticket printer 222. Such an example has the advantage of more accurately documenting the user's gaming session at the player tracking system server 110.

In some embodiments, there may be additional functionality or monitoring the gaming session, for example, the server 110 may poll the mobile terminal 430 periodically to check that the mobile terminal 430 is still monitoring the beacon 420.

Another embodiment may include an implementation whereby the mobile terminal periodically polls the system so both the mobile terminal and system can determine that communication is still active. The game session and transfer of any money from the gaming machine to the player's account may occur when the system determines the mobile is no longer communicating.

In an alternative embodiment, a different process is used to start the gaming session and the beacon 420 is only used by the mobile terminal 430 to monitor whether to end the gaming session. For example, a near field communication (NFC) transceiver could be incorporated within the player marketing module 105D and the user could bring their mobile terminal into close enough proximity (satisfying a proximity criterion) to the NFC transceiver to start a gaming session. In this example, the mobile terminal 430 may communicate a user identifier to the player marketing module 105D that enables the player marketing module 105D to initiate a funds transfer request from the player tracking system server 110 such that the initial funds transfer request does not require the mobile terminal 430 to communicate with the server.

Accordingly, as described herein, a variety of specific technical improvements are achieved in specific manners by the present disclosure. For example, in at least some embodiments, at least one specific technical improvement is to the field of electronic gaming, and more particularly, to the technical field of proximity based electronic gaming.

These improvements are accomplished, as described in detail herein, by the use of a first threshold signal strength (corresponding to a first threshold distance between a player's mobile terminal/device and an EGM) as a prerequisite to establishing a gaming session and/or initiating a wagering game. This may ensure that a player's mobile device is sufficiently near the EGM (e.g., less than one meter) prior to initiation of the wagering game. Likewise, once the wagering game is securely established, the signal strength requirement may be reduced (e.g., by several meters), such that the player has some freedom to roam in proximity to the EGM.

These improvements therefore include the addition of a security requirement (e.g., that the player is sufficiently close to the EGM) prior to establishing a gaming session. Once the gaming session is established, the security requirement may be relaxed, whereby the player has some ability to move around the EGM (e.g., to stand up from the EGM), such as, for example, to take a phone call on his or her mobile device, to send an email or text message using the mobile device, to take a photograph using the mobile device, to stretch or take a short break from the gaming session, and the like.

Another specific technical improvement is to the electronic gaming system itself. Specifically, as described herein, the system of the present disclosure reduces or eliminates reliance on a physical loyalty club card for player identification and retrieval of credit balance information. Rather, the systems and methods of the present disclosure facilitate a secure, wireless, and card-less (e.g., loyalty card-less) mechanism for identifying a player, providing a wagering game to the player on an EGM within a casino based upon the player's proximity to the EGM, retrieving the player's credit balance from a backend system, such as player tracking system server 110, providing the wagering game, and uploading or transferring the player's new or adjusted credit balance back to the player tracking system server 110 on termination of the gaming session.

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

What is claimed is:

1. An electronic gaming device comprising:

a display device;

a memory; and a processor configured to execute instructions stored in the memory, which when executed, cause the processor to:

transmit, using a wireless communication device, a wireless communication device signal;

receive, from a gaming system and related to at least one first proximity criterion between a mobile device of a player and the wireless communication device being met, at least one instruction to initiate a gaming session; and in response to receiving the at least one instruction to initiate the gaming session, initiate the gaming session and increase a strength of the wireless communication device signal.

2. The electronic gaming device of claim 1, wherein the instructions, when executed, further cause the processor to:

receive, from the gaming system and related to a second proximity criterion between the mobile device of the player and the wireless communication device being met, at least one additional instruction to terminate the gaming session; and terminate the gaming session in response to the at least one additional instruction.

3. The electronic gaming device of claim 2, wherein the at least one instruction to initiate the gaming session is received in response to the mobile device of the player being within a first distance of the wireless communication device, and wherein the at least one additional instruction to terminate the gaming session is received in response to the mobile device of the player being outside a second distance of the wireless communication device.

4. The electronic gaming device of claim 3, wherein the second distance is greater than the first distance, whereby the mobile device must be physically closer to the wireless communication device to cause initiation of the gaming session, and whereby after initiation of the gaming session, the mobile device is allowed to move further away from the wireless communication device without causing termination of the gaming session.

5. The electronic gaming device of claim 1, wherein the instructions, when executed, further cause the processor to:

receive, from the gaming system, at least one instruction to increase a credit balance of the player, the at least one instruction to increase the credit balance of the player received in response to generation, by the mobile device, of a funds transfer request, the funds transfer request processed by the gaming system; and increase the credit balance of the player in response to receiving the at least one instruction to increase the credit balance.

6. The electronic gaming device of claim 1, wherein the instructions, when executed, further cause the processor to:

in response to terminating the gaming session i) transmit a credit balance of the player to the gaming system, and ii) remove the credit balance of the player from the memory of the electronic gaming device.

7. The electronic gaming device of claim 1, wherein the wireless communication device comprises a wireless beacon device and the at least one first proximity criterion comprises a first signal strength.

8. At least one non-transitory computer-readable storage medium with instructions stored thereon that, in response to execution by at least one processor, cause the at least one processor to:

send, using a wireless communication device, a wireless communication device signal;

receive, from a gaming system and associated with at least one first proximity criterion between a mobile device of a player and the wireless communication device being met, at least one instruction to initiate a gaming session at a gaming device; and based on receiving the at least one instruction to initiate the gaming session, initiate the gaming session at the gaming device and increase a strength of the wireless communication device signal.

9. The at least one non-transitory computer-readable storage medium of claim 8, wherein the instructions further cause the at least one processor to:

receive, from the gaming system and related to a second proximity criterion between the mobile device of the player and the wireless communication device being met, at least one additional instruction to terminate the gaming session; and cause the gaming session to end in response to receiving the at least one additional instruction.

10. The at least one non-transitory computer-readable storage medium of claim 9, wherein the at least one instruction to initiate the gaming session is received in response to the mobile device of the player being within a first distance of the wireless communication device, and wherein the at least one additional instruction to terminate the gaming session is received in response to the mobile device of the player being outside a second distance of the wireless communication device.

11. The at least one non-transitory computer-readable storage medium of claim 10, wherein the second distance is greater than the first distance, whereby the mobile device must be physically closer to the wireless communication device to cause initiation of the gaming session, and whereby after initiation of the gaming session, the mobile device is allowed to move further away from the wireless communication device without causing termination of the gaming session.

12. The at least one non-transitory computer-readable storage medium of claim 8, wherein the instructions further cause the at least one processor to:

receive, from the gaming system, at least one instruction to increase a credit balance associated with the player, the at least one instruction to increase the credit balance of the player received based on generation, by the mobile device, of a funds transfer request, the funds transfer request processed by the gaming system; and cause the credit balance associated with the player to increase in response to receiving the at least one instruction to increase the credit balance.

13. The at least one non-transitory computer-readable storage medium of claim 8, wherein the instructions further cause the at least one processor to, based on terminating the gaming session, i) send a credit balance associated with the player to the gaming system, and ii) remove the credit balance associated with the player from a memory of the gaming device.

14. The at least one non-transitory computer-readable storage medium of claim 8, wherein the wireless communication device comprises a wireless beacon device and the at least one first proximity criterion comprises a first signal strength.

15. A method of electronic gaming implemented by at least one processor in communication with at least one memory, the method comprising:

transmitting, using a wireless communication device, a wireless communication device signal;

receiving, from a gaming system and related to at least one first proximity criterion between a mobile device of a player and the wireless communication device being met, at least one instruction to initiate a gaming session; and in response to receiving the at least one instruction to initiate the gaming session, causing the gaming session to be initiated and causing a strength of the wireless communication device signal to increase.

16. The method of claim 15, further comprising:

receiving, from the gaming system and related to a second proximity criterion between the mobile device of the player and the wireless communication device being met, at least one additional instruction to terminate the gaming session; and causing the gaming session to end in response to receiving the at least one additional instruction.

17. The method of claim 16, wherein the at least one instruction to initiate the gaming session is received in response to the mobile device of the player being within a first distance of the wireless communication device, and wherein the at least one additional instruction to terminate the gaming session is received in response to the mobile device of the player being outside a second distance of the wireless communication device.

18. The method of claim 17, wherein the second distance is greater than the first distance, whereby the mobile device must be physically closer to the wireless communication device to cause initiation of the gaming session, and whereby after initiation of the gaming session, the mobile device is allowed to move further away from the wireless communication device without causing termination of the gaming session.

19. The method of claim 15, further comprising:

receiving, from the gaming system, at least one instruction to increase a credit balance associated with the player, the at least one instruction to increase the credit balance of the player received based on generation, by the mobile device, of a funds transfer request, the funds transfer request processed by the gaming system; and causing the credit balance associated with the player to increase in response to receiving the at least one instruction to increase the credit balance.

20. The method of claim 15, further comprising, based on terminating the gaming session, i) sending a credit balance associated with the player to the gaming system, and ii) removing the credit balance associated with the player from a memory of a gaming device.

* * * * *